(12) United States Patent
Bian

(10) Patent No.: US 12,416,106 B2
(45) Date of Patent: Sep. 16, 2025

(54) MELT-SPUN HIGH-VISCOSITY PET/LOW-VISCOSITY PET TWO-COMPONENT ELASTIC FIBER AND PREPARATION METHOD THEREFOR

(71) Applicant: JIANGSU GANGHONG FIBER CO., LTD., Suzhou (CN)

(72) Inventor: Shuchang Bian, Suzhou (CN)

(73) Assignee: JIANGSU GANGHONG FIBER CO., LTD., Suzhou (CN)

( * ) Notice: Subject to any disclaimer, the term of this patent is extended or adjusted under 35 U.S.C. 154(b) by 0 days.

(21) Appl. No.: 18/956,716

(22) Filed: Nov. 22, 2024

(65) Prior Publication Data

US 2025/0198056 A1      Jun. 19, 2025

Related U.S. Application Data

(63) Continuation-in-part of application No. PCT/CN2024/093277, filed on May 15, 2024.

(30) Foreign Application Priority Data

Dec. 13, 2023  (CN) .......................... 202311705739.8

(51) Int. Cl.
*D01F 8/14*      (2006.01)
*C08G 63/18*     (2006.01)
(Continued)

(52) U.S. Cl.
CPC ............. *D01F 8/14* (2013.01); *C08G 63/183* (2013.01); *C08G 63/87* (2013.01); *D01D 5/08* (2013.01); *D10B 2331/04* (2013.01)

(58) Field of Classification Search
CPC ...... D01F 8/14; D01D 5/08; D10B 2331/042; D10B 2331/04; C08G 63/183; C08G 63/785
(Continued)

(56) References Cited

U.S. PATENT DOCUMENTS

2023/0026102 A1*   1/2023  Fan ........................ D02G 3/326

FOREIGN PATENT DOCUMENTS

| CN | 101126180 A | 2/2008 |
| CN | 101851812 A | 10/2010 |

(Continued)

*Primary Examiner* — Fred M Teskin
(74) *Attorney, Agent, or Firm* — Dinsmore & Shohl LLP

(57) ABSTRACT

The present disclosure relates to a melt-spun high-viscosity PET/low-viscosity PET two-component elastic fiber and a preparation method therefor. The preparation method adopts a six-reactor process. Terephthalic acid and ethylene glycol undergo first and second esterification reactions and first and second prepolymerization reactions, and an obtained ethylene terephthalate prepolymer is respectively introduced into a high-viscosity final polymerization reactor and a low-viscosity final polymerization reactor for polymerization reaction to obtain a high-viscosity melt and a low-viscosity melt, respectively, and then the two melts are spun together. The viscosity of the high-viscosity component can be significantly improved, and a wider range of viscosity difference between the high-viscosity and low-viscosity polyester melts can be obtained. A difference between the intrinsic viscosity of the high-viscosity melt and the intrinsic viscosity of the low-viscosity melt is 0.100-0.550; the prepared PET/PET two-component elastic fiber has high quality and high crimp shrinkage rate.

18 Claims, 2 Drawing Sheets

(51) Int. Cl.
*C08G 63/183* (2006.01)
*C08G 63/87* (2006.01)
*D01D 5/08* (2006.01)

(58) Field of Classification Search
USPC .................................................. 264/172.17
See application file for complete search history.

(56) References Cited

FOREIGN PATENT DOCUMENTS

| | | | |
|---|---|---|---|
| CN | 104894688 | A | 9/2015 |
| CN | 106337212 | A | 1/2017 |
| CN | 107964690 | A | 4/2018 |
| CN | 111100278 | A | 5/2020 |
| CN | 111101237 | A | 5/2020 |
| CN | 111705370 | A | 9/2020 |
| CN | 115613159 | A | 1/2023 |
| CN | 116949600 | A | 10/2023 |
| CN | 117626476 | A | 3/2024 |

* cited by examiner

MELT-SPUN HIGH-VISCOSITY PET/LOW-VISCOSITY PET TWO-COMPONENT ELASTIC FIBER AND PREPARATION METHOD THEREFOR

CROSS-REFERENCE TO RELATED APPLICATIONS

This application is a Continuation-in-Part of PCT App. Serial No. PCT/CN2024/093277, having an International Filing Date of May 15, 2024, which claims the benefit of priority to Chinese Patent Application No. 202311705739.8 filed on Dec. 13, 2023, and the entire disclosure of both are hereby incorporated by reference.

TECHNICAL FIELD

The present disclosure relates to a melt-spun high-viscosity PET/low-viscosity PET two-component elastic fiber and preparation method therefor.

BACKGROUND

The application scope of elastic fibers in the modern chemical fiber industry is becoming wider and wider. Especially in recent years, with the rapid development of the theory of two-component elastic fibers, we have a deeper understanding of the forming mechanism and elasticity generation mechanism of parallel two-component elastic fibers, and the varieties of elastic fibers and original technologies have also made great progress. Starting from the 1970s, DuPont first launched single-component spandex elastic fiber, which quickly became popular in the market with its unique style and characteristics. In the late 1970s, the parallel two-component elastic fiber T800 was launched. Based on PBT/PET parallel compositing, T800 produces good elastic effect. However, due to the low glass transition temperature (26-42° C.) of the PBT component, the fiber undergoes rapid crystallization when subjected to force, and the elastic recovery and shape retention of the fiber T800 are poor. In the 21st century, with the successful industrialization of PDO by chemical and biological fermentation methods, the polyester PTT has a unique molecular structure and excellent elastic recovery performance. DuPont's T400, a PTT/PET two-component elastic fiber, was launched. The PTT/PET two-component parallel composite fiber has excellent elastic recovery and shape retention. The fabric will not deform after repeated stretching. Due to its elastic slow-release effect, T400 overcomes the restraining feeling of spandex elastic fiber. With its excellent resistance to chlorine bleaching and light, T400 has become the best elastic fiber variety in the fabric industry.

However, since the price of the PTT raw material is high, PTT/PET two-component fibers are basically used in the category of high-end fabrics. For some fabrics with lower elasticity requirements, the fibers are not outstanding in cost-effectiveness. Therefore, the development of two-component elastic fibers has become a key area of industry development in the past decade. The latest progress is to, based on the different orientation and crystallization behaviors between PET components of different viscosity, prepare PET/PET two-component elastic fibers by spinning, in parallel, a high-viscosity PET and a low-viscosity PET which have a certain viscosity difference. During the spinning process, due to the different speeds and percents of transition from an orientation state to a crystallization state, the high-viscosity component and the low-viscosity component produce elastic crimp to form a spring-like structure, thus showing a good elastic effect on the fabric. CN111101237A, CN101126180A, CN106337212A, CN107964690A, CN101851812A, CN115613159A and other patents respectively disclose a series of methods for preparing parallel composite elastic fibers such as PET/PET, PBT/PET, and PTT/PET, as well as methods for preparing easily dyeable or deeply dyeable elastic fibers by using a modified PET with elasticity retention (such as high-viscosity easy cationic dyeable polyester ECDP, high-viscosity high-shrinkage polyester, high-viscosity easy disperse dyeable polyester, high-viscosity cationic dyeable polyester CDP) and a low-viscosity PET.

The above-mentioned preparation methods of the elastic fibers are based on the production process of chip spinning of high-viscosity chips and low-viscosity chips respectively through pre-crystallization, melting of drying screw, to composite spinning and composite parallel spinneret forming, although the basic problems of parallel composite spinning technology are solved, chip spinning technology has obvious defects such as long process, high cost, low production capacity, and poor product quality stability.

SUMMARY OF THE DISCLOSURE

An objective of the present disclosure is to provide a melt-spun high-viscosity PET/low-viscosity PET two-component elastic fiber, and the elastic fiber can achieve very high elastic crimp and adjust different degrees of elastic crimp, and has low production cost. In the preparation of the elastic fiber, the viscosity of the high-viscosity melt is high enough, and the high-viscosity melt can better maintain high viscosity during melt transfer; and the preparation method has high production capacity.

Another objective of the present disclosure is to provide a preparation method for a melt-spun high-viscosity PET/low-viscosity PET two-component elastic fiber. By separately polymerizing a high-viscosity melt component and a low-viscosity melt component in a unique six-reactor polymerization device system, and then directly carrying out parallel composite spinning on the two melt compounds, the preparation method can prepare a high-viscosity PET/low-viscosity PET two-component elastic fiber simply and easily, thereby significantly reducing production costs and improving production efficiency.

To achieve the above objectives, the technical solution adopted by the present disclosure is as follows:

A preparation method for a PET two-component elastic fiber, the preparation method comprising steps of sequentially passing terephthalic acid, ethylene glycol and a catalyst through a first esterification reactor and a second esterification reactor for esterification reaction, and then a first prepolymerization reactor and a second prepolymerization reactor for prepolymerization reaction to obtain an ethylene terephthalate prepolymer, the preparation method further comprising a step of transferring the ethylene terephthalate prepolymer, via separate melt pumps, to a high-viscosity final polymerization reactor and a low-viscosity final polymerization reactor respectively for polymerization to obtain a high-viscosity PET melt and a low-viscosity PET melt respectively, wherein the viscosity of the high-viscosity PET melt is greater than the viscosity of the low-viscosity PET melt; and a step of spinning the high-viscosity PET melt and the low-viscosity PET melt through a same parallel composite spinning assembly to obtain the PET two-component elastic fiber, wherein a difference between the intrinsic viscosity of the high-viscosity PET melt and the intrinsic viscosity of the low-viscosity PET melt is 0.100-0.550.

In some embodiments, in percent by weight, the PET two-component elastic fiber comprises 30%-70% of a first PET component and 70%-30% of a second PET component, the viscosity of the first PET component is different from the viscosity of the second PET component.

In the present disclosure, a six-reactor polymerization device system is used for polymerization, wherein the viscosity difference (0.100-0.550) between the high-viscosity and low-viscosity melts can be adjusted orderly; as a result, elastic fibers with different crimp shrinkage rates can be produced according to the needs of different customers, thereby greatly increasing the indicator ranges of the device products and the flexibility level of the device.

The PET two-component elastic fiber of the present disclosure comprises two components (a high-viscosity component and a low-viscosity component). The foregoing preparation method for a PET two-component elastic fiber is a melt spinning process, that is, the melts obtained by polymerization are directly spun without the steps of melt cooling and chipping and then melting for spinning.

In some embodiments, the high-viscosity final polymerization reactor is a horizontal polymerization reactor and comprises a main body containing a chamber internally, the main body comprises a low-viscosity zone, a medium-high-viscosity zone, and a high-viscosity zone which are arranged in sequence along an axial direction of the high-viscosity final polymerization reactor, and the viscosity of the polyethylene terephthalate (PET) melt in the low-viscosity zone, the medium-high-viscosity zone, and the high-viscosity zone increases in sequence; the length of the low-viscosity zone is three-fifths of the length of the high-viscosity final polymerization reactor, and the length of the medium-high-viscosity zone and the high-viscosity zone is two-fifths of the length of the high-viscosity final polymerization reactor; the high-viscosity final polymerization reactor further comprises two agitating shafts, one of which is arranged in the low-viscosity zone and the other is arranged in the medium-high-viscosity zone and the high-viscosity zone, and the central axes of the two agitating shafts are located on a same straight line; the length of the agitating shaft arranged in the low-viscosity zone is three-fifths of the length of the high-viscosity final polymerization reactor, and the length of the agitating shaft arranged in the medium-high-viscosity zone and the high-viscosity zone is two-fifths of the length of the high-viscosity final polymerization reactor; the high-viscosity final polymerization reactor further comprises a trumpet-shaped high-viscosity melt outlet arranged at a rear end of the high-viscosity zone. This design is a double-shaft stirring design with unequal lengths at front and rear ends.

In the present disclosure, three-fifths and two-fifths are not the exact mathematical values of three-fifths and two-fifths, but refer to approximate three-fifths and two-fifths and thereabouts, which are approximately equal to three-fifths and two-fifths.

In some embodiments, each of the two agitating shafts is provided with a plurality of disc reactors; the disc reactors in the low-viscosity zone are in a multi-disc (three-to ten-disc) combination design, the front end of the low-viscosity zone is in a multi-disc (ten-to six-disc) combination design, the rear end of the low-viscosity zone is in a multi-disc (five-to three-disc) combination design, and the number of disc reactors in the low-viscosity zone is 35 to 55; the high-viscosity final polymerization reactor further comprises two round distribution plates arranged at the most front end of the low-viscosity zone, and each distribution plate has six spokes by which the distribution plate is divided into six equal parts, wherein sieve plates are arranged in three equally divided fan-shaped areas which are distributed at intervals, and a large number of round holes with a diameter of 1-5 cm are distributed in each sieve plate. The distribution plates can control the material to prevent the short circuit of low-viscosity materials so that the melt has more uniform molecular weight distribution.

In the present disclosure, the multi-disc combination design refers to fixing and connecting multiple adjacent disc reactors together so that the disc reactors can be selectively assembled together with the agitating shaft. The ten-to six-disc combination design refers to fixing ten to six disc reactors together.

In some embodiments, the disc reactors in the medium-high-viscosity zone are in a four-disc combination design, a three-disc combination design and a two-disc combination design in sequence from front to rear; the medium-high-viscosity zone is also provided with a wall scraper for removing the melt from an inner wall of the high-viscosity final polymerization reactor; the number of disc reactors in the medium-high-viscosity zone is 15 to 25; the disc reactors in the high-viscosity zone are in a two-disc combination design, and 5 to 8 two-disc combinations are arranged in the high-viscosity zone; the total number of disc reactors in the medium-high-viscosity zone and the high-viscosity zone is 25 to 35; a combined scraper is also arranged in the high-viscosity zone, and the combined scraper comprises an axial scraper for removing the melt from the agitating shaft, a wall scraper for removing the melt from the inner wall of the high-viscosity final polymerization reactor and a disc scraper for removing the melt from an agitator; in the two-disc combination design in the high-viscosity zone, the spacing between the disc combinations and the spacing between the two discs in each combination gradually increase from front to rear. The two-disc design is suitable for the preparation of a high-viscosity melt with relatively low viscosity (a rod-climbing effect may be caused if the viscosity is too high), with high film-drawing and devolatilization efficiency, low construction difficulty, excellent product quality, effectively reduced residence time, and low level of side reactions.

In the prior art, although a scraper is arranged in a conventional polymerization reactor, the scraper plays a relatively limited role due to its relatively simple structure. In the high-viscosity zone of the high-viscosity final polymerization reactor of the present disclosure, by adopting the combined scraper with the described specific structure, the renewal rate of materials on the discs of the disc reactors, the surfaces of the agitating shafts and the wall of the polymerization reactor can be effectively controlled, so that the materials in the three positions will not accumulate too much, and the problems of hue degradation and generation of a large amount of acetaldehyde in the production process of the high-viscosity melt can be effectively inhibited. In the combined scraper of the present disclosure, the disc scraper can control the thickness of the melt film on the discs, the wall scraper can timely renew the material on the wall of the polymerization reactor, and the axial scraper can clean the agitating shaft. By adopting the final polymerization reactor with the described combined scraper, the material residence time can be controlled to be 75 to 120 min, which is much less than the residence time (about 180 to 300 min, typically) of the conventional front and rear double-shaft high-viscosity disc reactor. The significant reduction in residence time effectively reduces the level of side reactions, which is conducive to the preparation of a high-viscosity polyester melt.

In some embodiments, the PET melt in the low-viscosity zone has an intrinsic viscosity of 0.45-0.60 and a dynamic viscosity of 90-240 Pa·s; the PET melt in the high-viscosity zone has an intrinsic viscosity of 0.68-0.90 and a dynamic viscosity of 500-1000 Pa·s.

The dynamic viscosity of the high-viscosity melt in the high-viscosity final polymerization reactor is very high. Under the condition of high dynamic viscosity, the flow state of the high-viscosity melt of the non-Newtonian fluid on the rotating discs of the disc reactors is quite different from that of the conventional low-viscosity polyester melt. The thickness of a melt film on the discs of the disc reactor increases sharply with the increase of dynamic viscosity, and then the rod-climbing effect of melt will occur, resulting in a significant increase of the residence time of the melt on the discs and a significant reduction in the mass transfer efficiency of the discs. In addition, under a vacuum condition, the volatilization and devolatilization efficiency of ethylene glycol produced by the polycondensation reaction is greatly reduced, the system devolatilization is slow, and the axial flow speed of the material on the disc reactors is low, and the vertical and axial mass transfer and heat transfer efficiency are greatly reduced. Under extreme high dynamic viscosity, the untreated melt will flood the top of the disc reactors, resulting in blocked vacuum channels in the high-viscosity final polymerization reactor, thus affecting the polymerization process. Finally, since the polymer material comes into contact with the wall of the final polymerization reactor and is difficultly replaced, the melt stays on the disc reactors and the reactor wall for too long, which greatly increases the level of side reactions during polycondensation. On the one hand, the amount of low-molecular by-products such as acetaldehyde produced in the final polymerization reactor is greatly increased. In severe cases, the vacuum system fails to perform devolatilization in time, resulting in a decrease in vacuum capacity. On the other hand, the materials accumulated for a long time produce catalytic cracking and cross-linking solidification, forming gel and carbonization. The formation of a large number of gel particles and condensed particles seriously affect the end and full roll rate of the product during the spinning process.

In this regard, the present disclosure adopts a six-reactor polymerization device system comprising a first esterification reactor, a second esterification reactor, a first prepolymerization reactor, a second prepolymerization reactor, a high-viscosity final polymerization reactor, and a low-viscosity final polymerization reactor, and also adopts two different designs of the high-viscosity final polymerization reactor. One of the designs is the aforementioned double-shaft stirring design with unequal lengths at front and rear ends (the length of the agitating shaft in a front chamber is three-fifths of the length of the reactor, and the length of the agitating shaft in a rear chamber is two-fifths of the length of the reactor, wherein the front chamber is the low-viscosity zone, and the rear chamber is composed of the medium-high-viscosity zone and the high-viscosity zone). The high-viscosity zone adopts a reinforced two-disc combination design to work together with the combined scraper. The present disclosure is characterized by simple design and easy use, and is suitable for the production of medium-high-viscosity polyesters. The other design is the following design of providing front and rear shafts with equal length. The high-viscosity zone in the rear chamber adopts a high-strength and high-efficiency single-disc design to work together with the combined scraper to more efficiently control the film formation on the discs. Since the material renewal efficiency in the high-viscosity zone is higher, the level of side reactions is effectively controlled. This design is suitable for the production of higher-viscosity melts.

In some embodiments, the high-viscosity final polymerization reactor is a horizontal polymerization reactor and comprises a main body containing a chamber internally, the main body comprises a low-viscosity zone, a medium-high-viscosity zone, and a high-viscosity zone which are arranged in sequence along an axial direction of the high-viscosity final polymerization reactor, and the viscosity of the PET melts in the low-viscosity zone, the medium-high-viscosity zone, and the high-viscosity zone increases in sequence; the length of the low-viscosity zone is half of the length of the high-viscosity final polymerization reactor, and the length of the medium-high-viscosity zone and the high-viscosity zone is half of the length of the high-viscosity final polymerization reactor; the high-viscosity final polymerization reactor further comprises two agitating shafts, one of which is arranged in the low-viscosity zone and the other is arranged in the medium-high-viscosity zone and the high-viscosity zone, and the central axes of the two agitating shafts are located on a same straight line; the length of the agitating shaft arranged in the low-viscosity zone is half of the length of the high-viscosity final polymerization reactor, and the length of the agitating shaft arranged in the medium-high-viscosity zone and the high-viscosity zone is half of the length of the high-viscosity final polymerization reactor; the high-viscosity final polymerization reactor further comprises a trumpet-shaped high-viscosity melt outlet arranged at a rear end of the high-viscosity zone. This design is a design of providing front and rear shafts with equal length.

In the present disclosure, a half is not the exact mathematical value of a half, but refers to approximately a half and thereabouts, which are approximately equal to a half.

In some embodiments, each of the two agitating shafts is provided with a plurality of disc reactors; the disc reactors in the low-viscosity zone are in a design of multiple multi-disc combinations; the high-viscosity final polymerization reactor further comprises two round distribution plates arranged at the most front end of the low-viscosity zone, and each distribution plate has six spokes by which the distribution plate is divided into six equal parts, wherein sieve plates are arranged in three equally divided fan-shaped areas which are distributed at intervals, and a large number of round holes with a diameter of 1-5 cm are distributed in each sieve plate.

In some embodiments, the disc reactors in the medium-high-viscosity zone are in a design of 8 to 10 double-disc combinations; the disc reactors in the high-viscosity zone are in a single-disc design and the number of disc reactors in the high-viscosity zone is 6 to 15; the disc reactors in the high-viscosity zone adopt a reinforced design; a combined scraper is also arranged in the high-viscosity zone, and the combined scraper comprises an axial scraper for removing the melt from the agitating shaft, a wall scraper for removing the melt from an inner wall of the high-viscosity final polymerization reactor, and a disc scraper for removing the melt from an agitator; the wall scraper is in a spiral shape that rotates along the axial direction; the axial scraper and the disc scraper are arranged between the disc reactors; the wall scraper is arranged at an outer edge of the disc reactor; from front to rear, the spacing between the disc scraper and the adjacent disc reactor and the spacing between the wall scraper and the inner wall of the high-viscosity final polymerization reactor gradually decrease; diameters of the disc reactors in the high-viscosity zone decrease in sequence from front to rear, and the diameter of the last disc reactor in the high-viscosity zone is 85% of the diameter of the first disc reactor in the high-viscosity zone. From the low-viscosity zone to the medium-high-viscosity zone then to the high-viscosity zone, the viscosity of the polyester melt obtained by polymerization increases continuously. Gradually increasing the spacing between the disc reactors can prevent the melt from clogging the disc reactors on the one hand, and it is conducive to the further advancement and polymerization of the melt on the other hand. In the disc reactor design, according to the feature of gradually increasing viscosity along the axis, the radius of the disc reactors gradually narrows. As a result, the load on the agitating shafts is reduced on the one hand, and the outer diameter of disc reactors at the rear end are gradually reduced on the other hand, thereby increasing the spatial area for the flow of volatile components at the rear end.

In the prior art, although a scraper is arranged in a conventional polymerization reactor, the scraper plays a relatively limited role due to its relatively simple structure. In the high-viscosity zone of the high-viscosity final polymerization reactor of the present disclosure, by adopting the combined scraper with the described specific structure, the renewal rate of materials on the discs of the disc reactors, the surfaces of the agitating shafts and the wall of the polymerization reactor can be effectively controlled, so that the materials in the three positions will not accumulate too much, and the problems of hue degradation and generation of a large amount of acetaldehyde in the production process of the high-viscosity melt can be effectively inhibited. In the combined scraper of the present disclosure, the disc scraper can control the thickness of the melt film on the discs, the wall scraper can timely renew the material on the wall of the polymerization reactor, and the axial scraper can clean the agitating shaft. By adopting the final polymerization reactor with the described combined scraper, the material residence time can be controlled to be 75 to 120 min, which is much less than the residence time (about 180 to 300 min, typically) of the conventional front and rear double-shaft high-viscosity disc reactor. The significant reduction in residence time effectively reduces the level of side reactions, which is conducive to the preparation of a high-viscosity polyester melt.

In some embodiments, the PET melt in the low-viscosity zone has an intrinsic viscosity of 0.45-0.60 and a dynamic viscosity of 90-240 Pa·s; the PET melt in the high-viscosity zone has an intrinsic viscosity of 0.68-0.90 and a dynamic viscosity of 450-1000 Pa·s.

For the described two agitating shaft designs, the following further structures or process steps are applicable.

In some embodiments, the high-viscosity final polymerization reactor further comprises steam feed ports for introducing superheated ethylene glycol steam arranged at the top of the main body corresponding to the rear end of the low-viscosity zone, the rear end of the medium-high-viscosity zone, and the rear end of the high-viscosity zone. The preparation method further comprises steps of metering the superheated ethylene glycol steam with a metering system and introducing the steam into the high-viscosity final polymerization reactor. The steam feed ports are arranged in the final polymerization reactor to achieve regular alcoholysis of gel and carbonized materials produced in the high-viscosity zone during the long-period operation of the device, thereby preventing carbonization on the top of the reactor. Moreover, according to the pressure increase of the spinning assembly, the viscosity of the materials on the discs in the high-viscosity zone are timely reduced and the materials are timely removed, so that the long-period aged and deteriorated materials are depolymerized and removed from the surfaces of the discs, thereby rebuilding the material distribution of the discs and prolonging the operation period of the device.

In some embodiments, the high-viscosity final polymerization reactor is connected to a vacuum pump, wherein the vacuum pump is a liquid ring pump and a chilled water device for cooling gas is arranged at an inlet of the liquid ring pump. In the preparation method, the vacuum pump is controlled to have a gas sucking rate of 200-350 kg/h, the vacuum pump has an ultimate vacuum degree of 50-65 Pa, and in a production state, the vacuum degree in the final polymerization reactor is controlled to be 100-180 Pa.

In the present disclosure, due to the increase of side reactions of materials in the high-viscosity zone and the overall decrease in the efficiency of devolatilization, the amount of volatiles produced in the final polymerization reactor is 2.5-3.2 times that of a conventional polyester unit with the same production capacity. The higher the viscosity at the high-viscosity melt outlet, the higher the amount of non-condensable gas produced. Therefore, the gas sucking rate of the vacuum pump is designed to be 2.0-3.0 times that of a conventional polyester unit with the same production capacity, the ultimate vacuum degree is designed to be 50-65 Pa, and the gas sucking rate is designed to be 200-350 kg/h, and a large-capacity chilled water device is designed at the inlet of the vacuum pump (the liquid ring pump) to capture excess non-condensable acetaldehyde. In order to further maintain production stability, all ethylene glycol produced from the vacuum part of the device must be subjected to formaldehyde removal treatment before entering the system.

In some embodiments, the catalyst is a supported catalyst and comprises a carrier and an active component; the carrier is nano barium sulfate with a particle size of 20-50 nm and a specific surface area of 270-350 $m^2/g$; the nano barium sulfate is prepared by reaction in anhydrous ethylene glycol; the active component comprises a main active component and a secondary active component, the main active component is titanium oxide, and the secondary active component is a mixture of scandium oxide, magnesium oxide, cobalt oxide and zinc oxide.

In some embodiments, the catalyst comprises, in percent by weight, 3.3% to 10.0% of titanium oxide, 8% to 15% of the secondary active component, and 75.0% to 88.7% of nano barium sulfate.

In some embodiments, the catalyst has a particle size of 80-160 nm.

In some embodiments, the catalyst is prepared by precipitating a suspension of the carrier in ethylene glycol, scandium sulfate, magnesium sulfate, cobalt sulfate, zinc sulfate, a compound of titanium, and a precipitant, surface treating with a silane coupling agent, and calcining.

In some embodiments, the scandium sulfate, the magnesium sulfate, the cobalt sulfate, and the zinc sulfate are added in the form of an aqueous solution.

In some embodiments, the compound of titanium is tetrabutyl titanate (TBT) or tetraisopropyl titanate (TPT).

In some embodiments, the precipitant is sodium hydroxide, preferably a solution of sodium hydroxide in ethylene glycol.

In the present disclosure, a high-stability polyester formula is used, PTA and EG are used for esterification and polymerization reaction, and the catalyst used is a self-developed titanium-based solid-phase multi-metal catalyst. During synthesis of the catalyst, firstly, nano-sized barium sulfate is prepared in an ethylene glycol liquid phase, the barium sulfate is controlled to have a particle size of 20-50 nm and a specific surface area of 270-350 m²/g, and the pH of the barium sulfate suspension is controlled to be 7.0-7.1; then, under high-speed stirring, the aqueous solution of scandium sulfate, magnesium sulfate, cobalt sulfate, the zinc sulfate and the solution of sodium hydroxide in ethylene glycol are simultaneously added dropwise, and then the suspension is aged, and the compound of titanium is then added dropwise to the suspension; the suspension is then aged again, and a silane coupling agent is added dropwise to seal the powder surface; after another 10.0 hours of aging, water and low-boiling-point alcohol are distilled off, the pH is adjusted to neutral, and filtering and calcining are performed to obtain the catalyst.

The titanium-based solid-phase multi-metal catalyst is a porous solid-phase catalyst with a large specific surface area. The catalyst has a good dispersion effect in ethylene glycol, overcomes the disadvantage of conventional liquid-phase titanium-based catalysts that are prone to hydrolysis during the esterification polymerization process, has an excellent catalytic effect, and can effectively inhibit the level of side reactions. Compared with traditional antimony-based catalysts, this catalyst can ensure that the high-viscosity melt has better thermal stability and thermal oxygen stability. This catalyst can also ensure that the viscosity drop during melt transfer is reduced by about 12% to 18%, compared with the antimony-based catalysts.

In some embodiments, melt pumps are used to transfer the high-viscosity PET melt and the low-viscosity PET melt, a melt cooler is arranged at an outlet of each melt pump, and in the preparation method, the temperature of the high-viscosity PET melt cooled by the melt cooler is controlled to be 284-286° C.; a filter and a booster pump are arranged between each melt pump and the parallel composite spinning assembly; in the preparation method, the transfer time of the high-viscosity PET melt is controlled to be 25-35 min; and a plurality of static slow-flow mixers are arranged at a front end of a melt pipeline.

In the present disclosure, an ultra-short-process efficient high-viscosity polyester melt transfer design is provided; a large-capacity melt cooler is equipped at the outlet of each melt pump to quickly control the melt temperature to be 284-286° C., and then the melts are transferred to spinning units via filters and booster pumps. The design concept of the ultra-short process is to change the location of the final polymerization reactor from the polymerization device to the top of the spinning device, so that the melts are transferred to the spinning units within the shortest transfer time. The conventional polyester melt transfer time is generally 50-70 min, and the short-process high-viscosity melt transfer requires the transfer time to be reduced to 25-35 min. A more stringent design is that the residual internal stress kinetic energy of the melt must be completely released within this residence time range. Therefore, a special front-end multi-position static slow-flow mixer is designed to quickly achieve the plug flow effect without increasing the residence time.

In some embodiments, the preparation method further comprises a step of introducing a viscosity reducer into the high-viscosity PET melt before the high-viscosity PET melt passes through the filter, wherein the viscosity reducer is selected from the group consisting of poly (ethylene terephthalateco-1,4-cyclohexanedimethylene terephthalate) PETG, cationic dyeable polyester CDP, easy cationic dyeable polyester ECDP, atmospheric pressure boiling dyeing polyester EDDP, polybutylene terephthalate PBT, poly (trimethylene terephthalate) PTT, and combinations thereof.

Further, the amount of the viscosity reducer is 0.2%-3.0%, preferably 0.5%-2.0%, more preferably 0.8%-1.5%, of the total mass of the melt. The addition of the viscosity reducer can greatly reduce the kinematic viscosity of the high-viscosity melt, improve the melt transfer efficiency, and reduce process degradation.

Before the high-viscosity melt is transferred to the filter, an additive injection system is designed to inject the viscosity reducer. The addition of the viscosity reducer can greatly improve the fluidity of the high-viscosity melt, improve the internal stress elimination effect of the high-viscosity melt, and enhance the plug flow effect. It can achieve a more stable spinning effect and improved fiber crimp, without affecting the basic indicators and quality of the final two-component elastic fiber product.

In some embodiments, the preparation method further comprises a step of introducing a solid-phase smoothing agent into the ethylene terephthalate prepolymer before introducing the ethylene terephthalate prepolymer into the high-viscosity final polymerization reactor, and a step of passing the mixture of the solid-phase smoothing agent and the ethylene terephthalate prepolymer through the filter, wherein the solid-phase smoothing agent is in the form of a masterbatch and comprises a polyester matrix and an inorganic powder, and the inorganic powder is selected from the group consisting of talc, montmorillonite, barium sulfate, hydrotalcite, nano-silica and combinations thereof.

Further, the amount of the solid-phase smoothing agent is 0.05%-1.0%, preferably 0.06%-0.8%, more preferably 0.1%-0.5%, of the total mass of the melt.

The solid-phase smoothing agent is an inert powder that can produce a good slip effect. The solid-phase smoothing agent can reduce the rapid thickening effect of the high-viscosity melt, and also can form a vaporization center, accelerate the overflow of small molecular materials, improve the devolatilization efficiency reduce the temperature rise effect during melt transfer, greatly reduce the kinematic viscosity of the high-viscosity melt and improve the melt transfer efficiency. The addition of the solid-phase smoothing agent can generate friction between the fluid surface and the pipe wall, thereby improving the fluidity of the melt and reducing the viscosity of the melt accordingly.

In some embodiments, the preparation method further comprises a step of introducing a heat stabilizer, an antioxidant or a colorant into the second esterification reactor before the second esterification reaction, wherein the heat stabilizer is selected from the group consisting of trimethyl phosphate, triethyl phosphate, triphenyl phosphate, triphenyl phosphite, triglycerol phosphate, and combinations thereof; the antioxidant is selected from the group consisting of Antioxidant 168, Antioxidant 1076, Antioxidant 1010, Antioxidant 1222, benzothiazole antioxidants, and combinations thereof.

The introduction of the heat stabilizer and the antioxidant into the second esterification reactor can improve the thermal stability and oxidation resistance of the high-viscosity PET melt, so that side reactions can be suppressed during the esterification and polymerization process, and the viscosity drop caused by thermal degradation of the high-viscosity melt during the residence time of up to 40 min to 90 min in the melt spinning process can be suppressed, and the intrinsic viscosity level of the melt is ensured to be still high in the spinning manifold, thereby generating sufficient elastic crimp.

In some embodiments, the preparation method further comprises a step of introducing a liquid-phase lubricant into the high-viscosity PET melt before the high-viscosity PET melt passes through the filter, wherein the liquid-phase lubricant is selected from the group consisting of polyethylene glycol with a molecular weight of 8000-20000, polyetheramine with a molecular weight of 10000-20000, poly (butylene glycol) adipate with a molecular weight of 5000-20000, polyacrylate and combinations thereof.

Further, the amount of the liquid-phase lubricant is 0.1%-2.0%, preferably 0.3%-1.5%, more preferably 0.5%-1.0%, of the total mass of the melt.

In some embodiments, a difference between the dynamic viscosity of the high-viscosity PET melt and the dynamic viscosity of the low-viscosity PET melt is 250-700 Pa·s, preferably 450-630 Pa·s. Further preferably, the difference between the intrinsic viscosity of the high-viscosity PET melt and the intrinsic viscosity of the low-viscosity PET melt is 0.30-0.45, and the difference between the dynamic viscosity of the high-viscosity PET melt and the dynamic viscosity of the low-viscosity PET melt is 500-600 Pa·s.

In some embodiments, the preparation method further comprises the step of mixing a mixture of the solid-phase smoothing agent and the ethylene terephthalate prepolymer by a dynamic mixer before the mixture of the solid-phase smoothing agent and the ethylene terephthalate prepolymer passes through the filter.

In some embodiments, the preparation method further comprises a step of filtering the ethylene terephthalate prepolymer in the filter before introducing the ethylene terephthalate prepolymer into the high-viscosity final polymerization reactor and the low-viscosity final polymerization reactor.

In some embodiments, the preparation method further comprises a step of passing the high-viscosity PET melt and the low-viscosity PET melt through filters respectively before the high-viscosity PET melt and the low-viscosity PET melt pass through the same spinning assembly.

In some embodiments, the high-viscosity final polymerization reactor is arranged at the top of the spinning assembly. In this way, the transfer distance of the high-viscosity melt synthesized in the high-viscosity final polymerization reactor before spinning can be reduced.

In some embodiments, the same spinning assembly is a composite spinning manifold.

In some embodiments, the composite spinning manifold comprises a composite spinneret.

The present disclosure further provides a PET two-component elastic fiber prepared by the preparation method described above.

In some embodiments, the PET two-component elastic fiber has a crimp shrinkage rate of 18%-38%.

Due to the application of the described technical solution, the present disclosure has the following advantages compared with the prior art:

In the present disclosure, a six-reactor polymerization device system comprising a first esterification reactor, a second esterification reactor, a first prepolymerization reactor, a second prepolymerization reactor, a high-viscosity final polymerization reactor, and a low-viscosity final polymerization reactor is adopted, and the high-viscosity final polymerization reactor is configured in a double-shaft stirring form with unequal lengths at the front and rear ends, that is, the length of the low-viscosity zone in the high-viscosity final polymerization reactor is unequal to the total length of the medium-high-viscosity zone and the high-viscosity zone, and the length of the low-viscosity zone is controlled to be longer. Moreover, a special disc reactor arrangement and a scraper arrangement are provided in the three zones. In this way, the viscosity of the high-viscosity melt in the high-viscosity final polymerization reactor is significantly improved and the molecular weight distribution of the melt is narrowed. Moreover, the high-viscosity final polymerization reactor and the low-viscosity final polymerization reactor are used to synthesize the high-viscosity melt and the low-viscosity melt, respectively. In this way, the viscosity difference between the high-viscosity melt and the low-viscosity melt can be adjusted effectively, and then the crimp rate and shrinkage rate of the final two-component elastic fiber can be adjusted.

Alternatively, in the present disclosure, the high-viscosity final polymerization reactor may be configured in a double-shaft stirring form with equal length at the front and rear ends, that is, the length of the low-viscosity zone is equal to the total length of the medium-high-viscosity zone and the high-viscosity zone; moreover, a specific disc reactor arrangement and a scraper arrangement are provided in the three zones. In this way, the viscosity of the high-viscosity melt can be improved, thereby effectively adjusting the viscosity difference between the high-viscosity melt and the low-viscosity melt and further adjusting the crimp rate and shrinkage rate of the final two-component elastic fiber.

In the present disclosure, the high-viscosity melt has an intrinsic viscosity of 0.68-0.90, and the low-viscosity melt has an intrinsic viscosity of 0.45-0.64. The viscosity of the high-viscosity melt is much higher than that in the prior art.

The PET two-component elastic fiber of the present disclosure has a crimp shrinkage rate of 38%, which is much higher than that of the existing two-component elastic fiber.

When used for industrial production of a two-component elastic fiber, the preparation method of the present disclosure can achieve a low-viscosity melt capacity of 30,000 to 80,000 tons/year and a high-viscosity melt capacity of 30,000 to 80,000 tons/year. When the product is melt-spun high-viscosity PET/low-viscosity PET two-component elastic fiber, the overall device capacity is 60,000 tons/year to 160,000 tons/year.

wherein, 1. low-viscosity zone; 2. medium-high-viscosity zone; 3. high-viscosity zone; 4. combined scraper; 5. disc scraper; 6. axial scraper; 7. wall scraper; 8. agitating shaft; 9. disc reactor; 10. first esterification reactor; 11. second esterification reactor; 12. first prepolymerization reactor; 13. second prepolymerization reactor; 14. high-viscosity final polymerization reactor; 15. low-viscosity final polymerization reactor; 16. melt pump; 17. steam feed port.

DETAILED DESCRIPTION OF PREFERRED EMBODIMENTS

The above solutions are further described in conjunction with specific embodiments below. It should be understood that these embodiments are used to illustrate the basic principles, main features and advantages of the present disclosure, and the present disclosure is not limited by the scope of the following embodiments. The implementation conditions used in the embodiments can be further adjusted according to specific requirements, and the implementation conditions not specified are usually the conditions in conventional experiments. In the following embodiments, unless otherwise specified, all raw materials are purchased from commercial sources or prepared by conventional methods in the art.

The above embodiments are only for illustrating the technical concept and features of the invention, and their purpose is to enable people familiar with this technology to understand the content of the invention and implement it accordingly, but not to limit the scope of the present disclosure. Any equivalent changes or modifications made according to the spirit of the present disclosure should fall within the scope of the present disclosure.

The present disclosure is further described below in conjunction with the accompanying drawings and the preferred embodiments of the present disclosure. In the following embodiments, it should be noted that directions referred to as terms "front" and "rear" are based on the flow direction of the material, the direction in which the material flows first is the front, and the direction in which the material flows later is the rear. For example, in FIG. 2, the term "front" refers to the left side in FIG. 2, and the term "rear" refers to the right side in FIG. 2. Therefore, the orientation and positional relationship described in the present disclosure are only for the convenience of describing the present disclosure and simplifying the description, rather than indicating or implying that the device or element referred to must have a specific orientation, only have a specific orientation, be constructed and operated in a specific orientation, and therefore cannot be understood as a limitation on the present disclosure.

Figure 1:
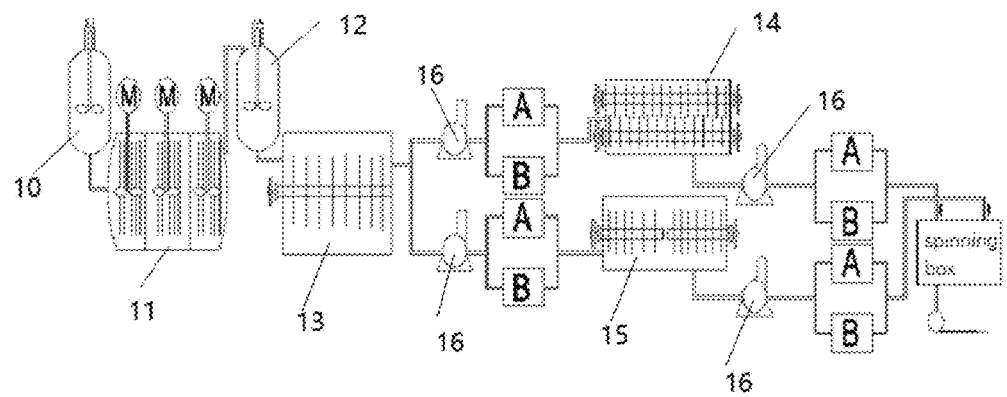
FIG. 1 is a schematic diagram of a six-reactor polymerization system used in an embodiment of the present disclosure.

As shown in FIG. 1, during the preparation of PET two-component elastic fiber in an embodiment, a six-reactor device system, comprising a first esterification reactor 10, a second esterification reactor 11, a first prepolymerization reactor 12, a second prepolymerization reactor 13, a high-viscosity final polymerization reactor 14, and a low-viscosity final polymerization reactor 15, is adopted. The six reactors are connected to each other by necessary pipelines, and a necessary vacuum system and the like is connected to the six reactors. Pumps 16 and filters A and B are arranged between the second prepolymerization reactor 13 and the high-viscosity final polymerization reactor 14 or the low-viscosity final polymerization reactor 15. In an actual production process, the filters A and B are not turned on at the same time. For example, the filter A may be turned on first, and after running for a period of time, the device is switched to the filter B, and then the filter A may be cleaned.

Figure 2:
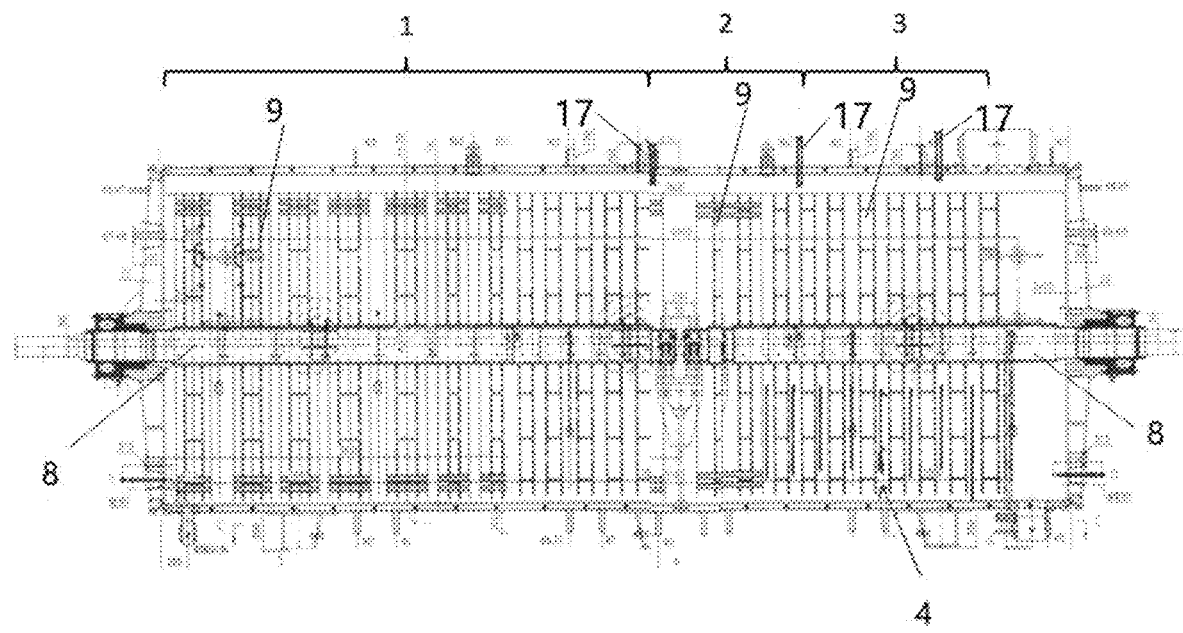
FIG. 2 is a schematic structural diagram of a high-viscosity final polymerization reactor in a first design in an embodiment of the present disclosure.

For the high-viscosity final polymerization reactor 14, its first design is a double-shaft stirring design with unequal lengths at front and rear ends. As shown in FIG. 2, the high-viscosity final polymerization reactor 14 comprises a main body containing a chamber internally. The main body comprises a low-viscosity zone 1, a medium-high-viscosity zone 2, and a high-viscosity zone 3 which are arranged in sequence along an axial direction of the high-viscosity final polymerization reactor 14, and the viscosity of the PET melt in the low-viscosity zone 1, the medium-high-viscosity zone 2, and the high-viscosity zone 3 increases in sequence; the length of the low-viscosity zone 1 is three-fifths of the length of the high-viscosity final polymerization reactor 14, and the length of the medium-high-viscosity zone 2 and the high-viscosity zone 3 is two-fifths of the length of the high-viscosity final polymerization reactor 14; the high-viscosity final polymerization reactor 14 further comprises two agitating shafts 8, one of which is arranged in the low-viscosity zone 1 and the other is arranged in the medium-high-viscosity zone 2 and the high-viscosity zone 3, and the central axes of the two agitating shafts 8 are located on a same straight line; the length of the agitating shaft 8 arranged in the low-viscosity zone 1 is three-fifths of the length of the high-viscosity final polymerization reactor 14, and the length of the agitating shaft 8 arranged in the medium-high-viscosity zone 2 and the high-viscosity zone 3 is two-fifths of the length of the high-viscosity final polymerization reactor 14; the high-viscosity final polymerization reactor 14 further comprises a trumpet-shaped high-viscosity melt outlet arranged at a rear end of the high-viscosity zone 3.

Each of the two agitating shafts 8 is provided with a plurality of disc reactors 9; the disc reactors 9 in the low-viscosity zone 1 are in a three-to ten-disc combination design, the front end of the low-viscosity zone 1 is in a ten-to six-disc combination design, the rear end of the low-viscosity zone 1 is in a five-to three-disc combination design, and the number of disc reactors 9 in the low-viscosity zone 1 is 35 to 55; the high-viscosity final polymerization reactor 14 further comprises two round distribution plates arranged at the most front end of the low-viscosity zone 1, and each distribution plate has six spokes by which the distribution plate is divided into six equal parts, wherein sieve plates are arranged in three equally divided fan-shaped areas which are distributed at intervals, and a large number of round holes with a diameter of 1-5 cm are distributed in each sieve plate. The distribution plates can control the material to prevent the short circuit of low-viscosity materials so that the melt has more uniform molecular weight distribution.

The disc reactors 9 in the medium-high-viscosity zone 2 are in a four-disc combination design, a three-disc combination design and a two-disc combination design in sequence from front to rear; the medium-high-viscosity zone 2 is also provided with a wall scraper 7 for removing the melt from an inner wall of the high-viscosity final polymerization reactor 14; the number of disc reactors 9 in the medium-high-viscosity zone 2 is 15 to 25; the disc reactors 9 in the high-viscosity zone 3 are in a two-disc combination design, and 5 to 8 two-disc combinations are arranged in the high-viscosity zone 3; the total number of disc reactors 9 in the medium-high-viscosity zone 2 and the high-viscosity zone 3 is 25 to 35.

Figure 4:
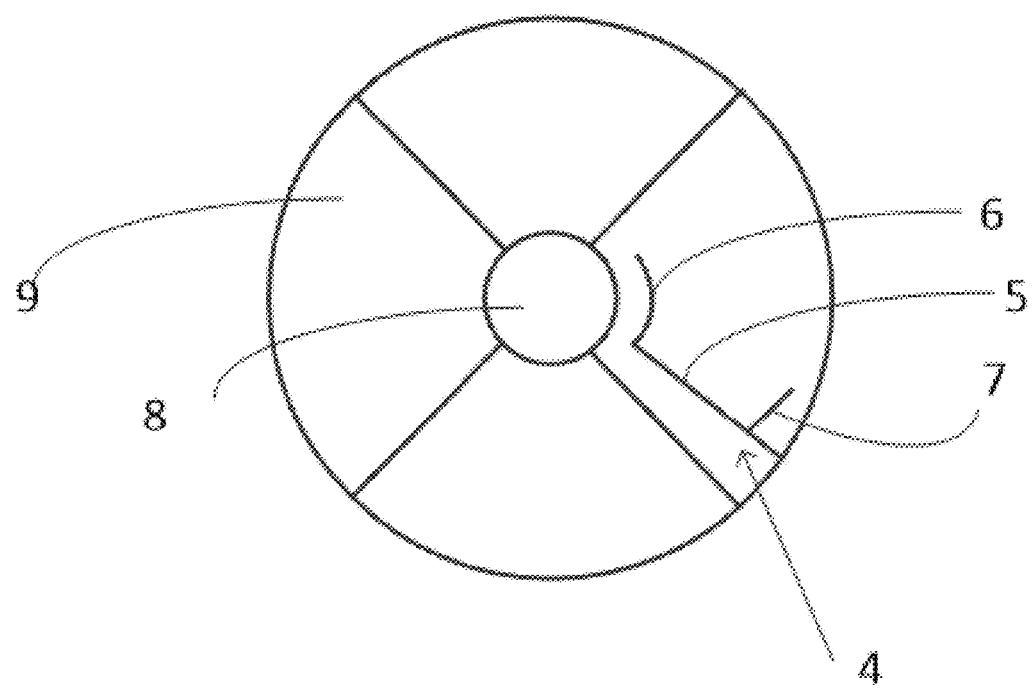
FIG. 4 is a schematic structural diagram of a combined scraper of the final polymerization reactor used in an embodiment of the present disclosure.

As shown in FIG. 4, a combined scraper 4 is also arranged in the high-viscosity zone 1, and the combined scraper 4 comprises an axial scraper 6 for removing the melt from the agitating shaft, a wall scraper 7 for removing the melt from the inner wall of the high-viscosity final polymerization reactor 14 and a disc scraper 5 for removing the melt from an agitator; in the two-disc combination design in the high-viscosity zone 3, the spacing between the disc combinations and the spacing between the two discs in each combination gradually increase from front to rear.

Figure 3:
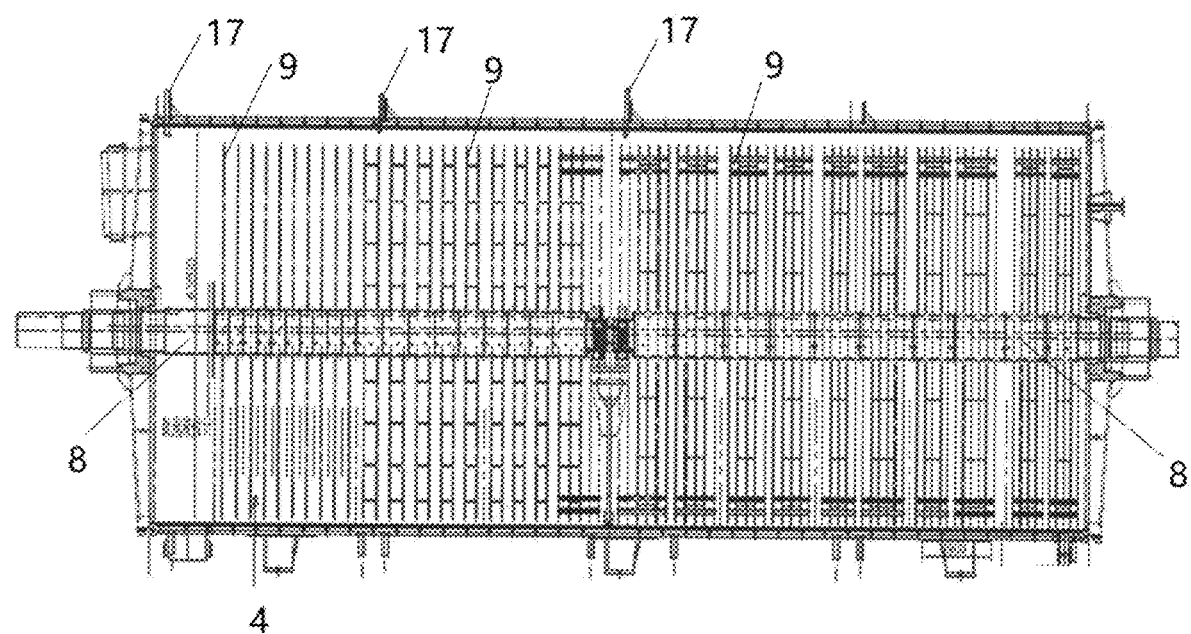
FIG. 3 is a schematic structural diagram of a high-viscosity final polymerization reactor in a second design in an embodiment of the present disclosure.

For the high-viscosity final polymerization reactor 14, its second design is a design of providing front and rear shafts with equal length. As shown in FIG. 3, the high-viscosity final polymerization reactor 14 is a horizontal polymerization reactor and comprises a main body containing a chamber internally. The main body comprises a low-viscosity zone 1, a medium-high-viscosity zone 2, and a high-viscosity zone 3 which are arranged in sequence along an axial direction of the high-viscosity final polymerization reactor 14, and the viscosity of the PET melt in the low-viscosity zone 1, the medium-high-viscosity zone 2, and the high-viscosity zone 3 increases in sequence; the length of the low-viscosity zone 1 is half of the length of the high-viscosity final polymerization reactor 14, and the length of the medium-high-viscosity zone 2 and the high-viscosity zone 3 is half of the length of the high-viscosity final polymerization reactor 14;

the high-viscosity final polymerization reactor 14 further comprises two agitating shafts 8, one of which is arranged in the low-viscosity zone 1 and the other is arranged in the medium-high-viscosity zone 2 and the high-viscosity zone 3, and the central axes of the two agitating shafts 8 are located on a same straight line; the length of the agitating shaft 8 arranged in the low-viscosity zone 1 is half of the length of the high-viscosity final polymerization reactor 14, and the length of the agitating shaft 8 arranged in the medium-high-viscosity zone 2 and the high-viscosity zone 3 is half of the length of the high-viscosity final polymerization reactor 14; the high-viscosity final polymerization reactor 14 further comprises a trumpet-shaped high-viscosity melt outlet arranged at a rear end of the high-viscosity zone 3.

Each of the two agitating shafts 8 is provided with a plurality of disc reactors 9; the disc reactors 9 in the low-viscosity zone 1 are in a design of multiple multi-disc combinations; the high-viscosity final polymerization reactor 14 further comprises two round distribution plates arranged at the most front end of the low-viscosity zone 1, and each distribution plate has six spokes by which the distribution plate is divided into six equal parts, wherein sieve plates are arranged in three equally divided fan-shaped areas which are distributed at intervals, and a large number of round holes with a diameter of 1-5 cm are distributed in each sieve plate.

The disc reactors 9 in the medium-high-viscosity zone 2 are in a design of 8 to 10 double-disc combinations; the disc reactors 9 in the high-viscosity zone 3 are in a single-disc design and the number of disc reactors 9 in the high-viscosity zone 3 is 6 to 15; the disc reactors 9 in the high-viscosity zone 3 adopt a reinforced design.

As shown in FIG. 4, a combined scraper is also arranged in the high-viscosity zone 3, and the combined scraper 4 comprises an axial scraper 6 for removing the melt from the agitating shaft 8, a wall scraper 7 for removing the melt from an inner wall of the high-viscosity final polymerization reactor 14, and a disc scraper 5 for removing the melt from an agitator; the wall scraper 7 is in a spiral shape that rotates along the axial direction; the axial scraper 6 and the disc scraper 5 are arranged between the disc reactors 9; the wall scraper 7 is arranged at an outer edge of the disc reactor 9; from front to rear, the spacing between the disc scraper 5 and the adjacent disc reactor 9 and the spacing between the wall scraper 7 and the inner wall of the high-viscosity final polymerization reactor 14 gradually decrease; diameters of the disc reactors 9 in the high-viscosity zone 3 decrease in sequence from front to rear, and the diameter of the last disc reactor 9 in the high-viscosity zone 3 is 85% of the diameter of the first disc reactor 9 in the high-viscosity zone 3.

The high-viscosity final polymerization reactor 14 further comprises steam feed ports 17 for introducing superheated ethylene glycol steam arranged at the top of the main body corresponding to the rear end of the low-viscosity zone 1, the rear end of the medium-high-viscosity zone 2, and the rear end of the high-viscosity zone 3.

The high-viscosity final polymerization reactor 14 is connected to a vacuum pump, wherein the vacuum pump is a liquid ring pump and a chilled water device for cooling gas is arranged at an inlet of the liquid ring pump. Melt pumps are used to transfer the high-viscosity PET melt and the low-viscosity PET melt, and a melt cooler is equipped at the outlet of each melt pump.

After the second prepolymerization reactor and before the high-viscosity final polymerization reactor, a dynamic mixer and a filter are arranged; and before the dynamic mixer, a solid-phase smoothing agent injection system is arranged.

After the high-viscosity final polymerization reactor and the low-viscosity final polymerization reactor and before the same spinning assembly, a dynamic mixer and a filter are arranged; and before the dynamic mixer, a viscosity reducer injection system is arranged.

Necessary melt pumps, vacuum pumps, transfer pipelines, and the like may be installed on pipelines connecting the six reactors.

The same spinning assembly is a composite spinning manifold, and the high-viscosity final polymerization reactor is arranged at the top of the composite spinning manifold, thereby shortening the transfer distance of the melt, especially the high-viscosity melt. The composite spinning manifold comprises a spinneret.

Example 1

This example provides a preparation method for a PET two-component elastic fiber, and the specific steps are as follows.

The catalyst used in this example is prepared as follows.

Sulfuric acid and barium hydroxide or barium acetate were used to react in anhydrous ethylene glycol to prepare a suspension of barium sulfate nanoparticles in ethylene glycol, and the generated acetic acid was removed by vacuum purification (when the raw material was barium acetate). The barium sulfate nanoparticles had a particle size of 20-50 nm and a specific surface area of 270-350 $m^2/g$. The pH of the suspension of barium sulfate nanoparticles in ethylene glycol was adjusted to 7.0-7.1; then, under high-speed stirring, a mixed aqueous solution of scandium sulfate, magnesium sulfate, cobalt sulfate and zinc sulfate and a solution of sodium hydroxide in ethylene glycol were then simultaneously added dropwise to the suspension in ethylene glycol; after added completely, the suspension was then aged for 8.0 hours, and then a compound of titanium (tetrabutyl titanate or isopropyl titanate) was added dropwise to the aged suspension within 5.0 hours, and the suspension was then further aged for 6.0 hours; finally, a silane coupling agent was added dropwise to the suspension to seal the powder surface; then, the suspension was further aged for 10.0 hours, water and low-boiling-point alcohol were distilled off, the pH of the suspension was adjusted to neutral, the suspension was then filtered and the resulting product was heat-set in a muffle furnace at 480-525° C. to obtain a supported catalyst. In the catalyst, barium sulfate nanoparticles were used as a carrier and scandium oxide, magnesium oxide, cobalt oxide, zinc oxide and titanium oxide were used as active components. The catalyst comprised, in percent by weight, 3.3% to 10.0% of titanium oxide, as well as oxides of scandium, magnesium, cobalt and zinc acting as secondary active components; the content of the oxides (secondary active components) was 8% to 15% of the total solid-phase components of the catalyst, and the content of the barium sulfate carrier was 75.0% to 88.7% of the total solid phase.

The described six-reactor polymerization device was used. Terephthalic acid, ethylene glycol, and the described catalyst sequentially passed through the first esterification reactor and the second esterification reactor for esterification reaction and then the first prepolymerization reactor and the second prepolymerization reactor for prepolymerization reaction to obtain an ethylene terephthalate prepolymer, and before second esterification reaction in the second esterification reactor, a common titanium dioxide matting agent color paste (prepared by grinding and dispersing titanium dioxide and ethylene glycol, where the titanium dioxide accounted for 10 wt % and the ethylene glycol accounted for 90 wt %), a heat stabilizer, an antioxidant, and a colorant were separately fed into different cells of the second esterification reactor by corresponding pipelines, where the flow rate of terephthalic acid was 2500-25000 kg/h, the flow rate of ethylene glycol was 1000-10000 kg/h, based on the titanium element, the amount of the catalyst was 8-12 ppm of the total mass of the melt, the amount of the titanium dioxide in the matting agent was 0.3% of the total mass of the melt, and the addition amounts of the heat stabilizer, the antioxidant and the colorant were 20 ppm, 50 ppm and 1 ppm respectively relative to the molar amount of terephthalic acid. Then, the ethylene terephthalate prepolymer was respectively introduced into the high-viscosity final polymerization reactor and the low-viscosity final polymerization reactor for polymerization to obtain a high-viscosity PET melt and a low-viscosity PET melt, respectively. Finally, the high-viscosity PET melt and the low-viscosity PET melt were directly introduced, at a mass ratio of 5:5, to the same parallel composite spinning manifold to be spun, thus obtaining a PET two-component elastic fiber.

The group experiments in Example 1 included 1-1, 1-2 to 9-1, 9-2, and the data are shown in Table 1 below.

The condition setting of the six-reactor polymerization device and the properties of the high-viscosity PET melt and the low-viscosity PET melt are shown in Table 1 below. Each melt was first dissolved in a mixed solvent of phenol and tetrachloroethane (v/v: 3:2) and then tested for its intrinsic viscosity in dL/g.

TABLE 1

Process conditions and viscosity of Example 1

| No. | Intrinsic viscosity of prepolymer | Vacuum degree of low-viscosity final polymerization reactor/Pa | Low-viscosity melt outlet temperature/° C. | Intrinsic viscosity of low-viscosity melt | Vacuum degree of high-viscosity final polymerization reactor/Pa | High-viscosity melt outlet temperature/° C. | Stirring speed of agitating shaft in high-viscosity zone/rpm | Intrinsic viscosity of high-viscosity melt | Intrinsic viscosity difference between high-viscosity and low-viscosity melts |
|---|---|---|---|---|---|---|---|---|---|
| 1-1 | 0.260 | 158.0 | 282.1 | 0.471 | 98.5 | 286.2 | 2.66 | 0.742 | 0.281 |
| 1-2 | 0.261 | 178.6 | 281.5 | 0.549 | 97.0 | 286.0 | 2.66 | 0.742 | 0.193 |
| 2-1 | 0.265 | 164.6 | 282.4 | 0.473 | 104.2 | 286.0 | 2.62 | 0.760 | 0.277 |
| 2-2 | 0.265 | 183.4 | 279.8 | 0.548 | 105.0 | 285.8 | 2.62 | 0.762 | 0.214 |
| 3-1 | 0.269 | 169.3 | 282.2 | 0.469 | 109.8 | 285.7 | 2.58 | 0.785 | 0.286 |
| 3-2 | 0.269 | 198.5 | 279.3 | 0.550 | 110.2 | 285.3 | 2.58 | 0.786 | 0.236 |
| 4-1 | 0.275 | 175.6 | 282.7 | 0.502 | 115.0 | 285.5 | 2.54 | 0.801 | 0.279 |
| 4-2 | 0.275 | 206.3 | 277.9 | 0.460 | 116.0 | 285.7 | 2.54 | 0.803 | 0.343 |
| 5-1 | 0.279 | 182.8 | 281.7 | 0.505 | 122.6 | 285.8 | 2.48 | 0.825 | 0.280 |
| 5-2 | 0.278 | 212.0 | 277.6 | 0.458 | 122.5 | 285.4 | 2.48 | 0.826 | 0.368 |
| 6-1 | 0.286 | 191.5 | 281.9 | 0.503 | 131.5 | 285.3 | 2.50 | 0.842 | 0.279 |
| 6-2 | 0.286 | 220.3 | 277.2 | 0.462 | 131.9 | 285.1 | 2.50 | 0.843 | 0.381 |
| 7-1 | 0.293 | 202.7 | 281.4 | 0.547 | 132.7 | 284.4 | 2.37 | 0.868 | 0.301 |
| 7-2 | 0.293 | 225.6 | 277.0 | 0.466 | 132.0 | 284.3 | 2.37 | 0.868 | 0.402 |
| 8-1 | 0.306 | 206.2 | 281.6 | 0.552 | 125.2 | 284.7 | 2.28 | 0.872 | 0.320 |
| 8-2 | 0.306 | 232.4 | 276.8 | 0.460 | 126.8 | 284.7 | 2.28 | 0.873 | 0.413 |
| 9-1 | 0.310 | 212.8 | 281.2 | 0.550 | 122.8 | 284.2 | 2.21 | 0.893 | 0.343 |
| 9-2 | 0.310 | 236.8 | 276.6 | 0.462 | 122.0 | 284.2 | 2.21 | 0.895 | 0.433 |

When the corresponding high-viscosity and low-viscosity PET melts in Example 1 were transferred to the spinneret and spun into fibers, the melt indicators and viscosity difference are shown in Table 2 below. The fiber properties of the present disclosure were all tested in accordance with the GBT8960-2015 test standard.

TABLE 2

Process conditions and viscosity at the spinning manifold in Example 1

| No. | Temperature of low-viscosity melt (at spinning manifold)/ °C. | Intrinsic viscosity of low-viscosity melt (at spinning manifold) | Temperature of high-viscosity melt (at spinning manifold)/ °C. | Intrinsic viscosity of high-viscosity melt (at spinning manifold) | Viscosity difference between high-viscosity and low-viscosity melts (at spinning manifold) |
|---|---|---|---|---|---|
| 1-1 | 275.8 | 0.463 | 288.2 | 0.678 | 0.215 |
| 1-2 | 275.5 | 0.535 | 289.0 | 0.676 | 0.141 |
| 2-1 | 275.7 | 0.459 | 288.8 | 0.682 | 0.223 |
| 2-2 | 275.8 | 0.531 | 288.6 | 0.685 | 0.154 |
| 3-1 | 275.6 | 0.457 | 288.8 | 0.697 | 0.240 |
| 3-2 | 275.3 | 0.537 | 289.5 | 0.694 | 0.157 |
| 4-1 | 275.7 | 0.485 | 289.2 | 0.709 | 0.224 |
| 4-2 | 276.2 | 0.450 | 289.7 | 0.707 | 0.257 |
| 5-1 | 275.7 | 0.492 | 288.2 | 0.719 | 0.227 |
| 5-2 | 275.6 | 0.447 | 288.6 | 0.721 | 0.274 |
| 6-1 | 275.9 | 0.490 | 288.7 | 0.740 | 0.250 |
| 6-2 | 275.2 | 0.451 | 289.1 | 0.743 | 0.292 |
| 7-1 | 275.4 | 0.534 | 288.4 | 0.749 | 0.215 |
| 7-2 | 276.0 | 0.455 | 289.3 | 0.752 | 0.302 |
| 8-1 | 275.6 | 0.539 | 288.7 | 0.769 | 0.230 |
| 8-2 | 276.1 | 0.449 | 288.9 | 0.773 | 0.324 |
| 9-1 | 276.2 | 0.537 | 288.8 | 0.788 | 0.251 |
| 9-2 | 276.3 | 0.450 | 289.2 | 0.785 | 0.335 |

The properties of the composite elastic fiber obtained by spinning the corresponding high-viscosity and low-viscosity PET melts in Example 1 are shown in Table 3.

TABLE 3

Physical and chemical indicators of PET/PET two-component composite elastic fibers in Example 1

| No. | Viscosity difference | Denier count/dtex | Strength/ cN/dtex | Elongation/ % | Oil content/% | Yarn evenness CV/% | Boiling water shrinkage/% | Crimp shrinkage rate/% | Interlacing point |
|---|---|---|---|---|---|---|---|---|---|
| 1-1 | 0.215 | 55.7 | 2.85 | 31.55 | 1.62 | 1.27 | 19.65 | 30.2 | 6 |
| 1-2 | 0.141 | 55.7 | 2.89 | 33.25 | 1.58 | 1.26 | 22.56 | 22.5 | 6 |
| 2-1 | 0.223 | 55.7 | 2.92 | 31.27 | 1.60 | 1.24 | 18.78 | 31.8 | 5 |
| 2-2 | 0.154 | 55.7 | 2.93 | 33.16 | 1.61 | 1.25 | 21.84 | 23.7 | 6 |
| 3-1 | 0.240 | 55.7 | 2.95 | 31.58 | 1.59 | 1.26 | 18.42 | 33.3 | 6 |
| 3-2 | 0.157 | 55.7 | 2.97 | 33.92 | 1.55 | 1.22 | 18.51 | 23.5 | 6 |
| 4-1 | 0.224 | 55.7 | 3.01 | 31.43 | 1.53 | 1.18 | 18.82 | 31.5 | 6 |
| 4-2 | 0.257 | 55.7 | 3.05 | 30.69 | 1.59 | 1.23 | 18.15 | 35.2 | 6 |
| 5-1 | 0.227 | 55.7 | 3.07 | 31.64 | 1.54 | 1.19 | 18.35 | 32.4 | 5 |
| 5-2 | 0.274 | 55.7 | 3.10 | 30.26 | 1.61 | 1.18 | 17.88 | 37.5 | 6 |
| 6-1 | 0.250 | 55.7 | 3.11 | 31.08 | 1.53 | 1.25 | 18.22 | 34.4 | 6 |
| 6-2 | 0.292 | 55.7 | 3.08 | 28.35 | 1.55 | 1.21 | 17.73 | 37.9 | 6 |
| 7-1 | 0.215 | 55.7 | 3.13 | 31.81 | 1.61 | 1.24 | 18.64 | 29.6 | 6 |
| 7-2 | 0.302 | 55.7 | 3.12 | 27.66 | 1.57 | 1.26 | 17.55 | 39.6 | 5 |
| 8-1 | 0.230 | 55.7 | 3.15 | 31.45 | 1.52 | 1.16 | 18.66 | 32.6 | 6 |
| 8-2 | 0.324 | 55.7 | 3.16 | 25.87 | 1.57 | 1.25 | 17.35 | 42.3 | 5 |
| 9-1 | 0.251 | 55.7 | 3.15 | 31.07 | 1.61 | 1.18 | 18.23 | 34.1 | 6 |
| 9-2 | 0.215 | 55.7 | 3.18 | 24.09 | 1.64 | 1.22 | 17.32 | 43.1 | 6 |

Example 2

This example provides a preparation method for a PET two-component elastic fiber and this method is basically the same as that of Example 1, except that: a solid-phase smoothing agent was also introduced to a solid-phase smoothing agent injection system, the solid-phase smoothing agent was specifically polyester masterbatch of talc with a particle size of 100 to 250 nm, and the amount of the solid-phase smoothing agent was 0.25% relative to the total mass of the melt; the different intrinsic viscosities of the high-viscosity melt and the low-viscosity melt were controlled, and the intrinsic viscosity of the high-viscosity melt was controlled within a range of 0.80 to 0.90. The corresponding device condition setting and melt properties are shown in Table 4 below. When the high-viscosity and low-viscosity PET melts were transferred to the spinneret and spun into fibers, the melt indicators and viscosity difference are shown in Table 5 below. Nos. 10-1, 10-2 and 10-3 correspond to Example 2.

Example 3

This example provides a preparation method for a PET two-component elastic fiber and this method is basically the same as that of Example 2, except that: a viscosity reducer was also introduced to a viscosity reducer injection system, the viscosity reducer was specifically PETG with an intrinsic viscosity of 0.58, tested using a mixed solvent of phenol and tetrachloroethane (v/v: 3:2), and the amount of the viscosity reducer was 0.5% relative to the total mass of the melt; the different intrinsic viscosities of the high-viscosity melt and the low-viscosity melt were controlled, and the intrinsic viscosity of the high-viscosity melt was controlled within a range of 0.80 to 0.90. The corresponding device condition setting and melt properties are shown in Table 4 below. When the high-viscosity and low-viscosity PET melts were transferred to the spinneret and spun into fibers, the melt indicators and viscosity difference are shown in Table 5 below. Nos. 11-1, 11-2 and 11-3 correspond to Example 3.

Example 4

This example provides a preparation method for a PET two-component elastic fiber and this method is basically the same as that of Example 1, except that: a liquid-phase lubricant was also introduced to a liquid-phase lubricant injection system, the liquid-phase lubricant was specifically poly (butylene glycol) adipate with a molecular weight of 10000, and the amount of the liquid-phase lubricant was 0.25% relative to the total mass of the melt; the different intrinsic viscosities of the high-viscosity melt and the low-viscosity melt were controlled, and the intrinsic viscosity of the high-viscosity melt was controlled within a range of 0.80 to 0.90. The corresponding device condition setting and melt properties are shown in Table 4 below. When the high-viscosity and low-viscosity PET melts were transferred to the spinneret and spun into fibers, the melt indicators and viscosity difference are shown in Table 5 below. Nos. 12-1, 12-2 and 12-3 correspond to Example 4.

By comparing the results of Examples 2-4 with the results of Example 1, it can be seen that due to the degradation reaction during the transfer of the high-viscosity PET melt, the viscosity of the high-viscosity melt at the spinning manifold becomes lower, and the actual viscosity difference between the high-viscosity and low-viscosity melts at the spinning manifold is lower than the viscosity difference between the chips of the two melts. After the solid-phase

TABLE 4

Process conditions and viscosity of Examples 2-4

| No. | Additive type | Vacuum degree of low-viscosity final polymerization reactor (Pa) | Low-viscosity melt outlet temperature/ °C. | Viscosity of low-viscosity melt | Vacuum degree of high-viscosity final polymerization reactor (Pa) | High-viscosity melt outlet temperature/ °C. | Viscosity of high-viscosity melt | Viscosity difference between high-viscosity and low-viscosity melts |
|---|---|---|---|---|---|---|---|---|
| 10-1 | Solid-phase | 158.0 | 282.1 | 0.461 | 145.5 | 286.2 | 0.802 | 0.341 |
| 10-2 | smoothing agent | 158.6 | 281.5 | 0.463 | 128.0 | 286.0 | 0.855 | 0.392 |
| 10-3 | (0.25%) | 154.6 | 282.4 | 0.463 | 104.2 | 286.0 | 0.902 | 0.439 |
| 11-1 | Viscosity reducer | 163.4 | 279.8 | 0.455 | 145.0 | 285.8 | 0.805 | 0.350 |
| 11-2 | (0.5%) | 169.3 | 282.2 | 0.456 | 129.8 | 285.7 | 0.853 | 0.397 |
| 11-3 |  | 168.5 | 279.3 | 0.453 | 110.2 | 285.3 | 0.899 | 0.446 |
| 12-1 | Liquid-phase | 175.6 | 282.7 | 0.455 | 145.0 | 285.5 | 0.801 | 0.351 |
| 12-2 | lubricant (0.25%) | 176.3 | 277.9 | 0.456 | 136.0 | 285.7 | 0.850 | 0.394 |
| 12-3 |  | 172.8 | 281.7 | 0.454 | 112.6 | 285.8 | 0.905 | 0.451 |

TABLE 5

Process conditions and viscosity at the spinning manifold in Examples 2-4

| No. | Additive type | Temperature of low-viscosity melt (at spinning manifold)/° C. | Viscosity of low-viscosity melt (at spinning manifold) | Temperature of high-viscosity melt (at spinning manifold)/° C. | Viscosity of high-viscosity melt (at spinning manifold) | Viscosity difference between high-viscosity and low-viscosity melts (at spinning manifold) |
|---|---|---|---|---|---|---|
| 10-1 | Solid-phase | 275.1 | 0.460 | 285.2 | 0.727 | 0.267 |
| 10-2 | smoothing | 276.3 | 0.461 | 284.7 | 0.768 | 0.307 |
| 10-3 | agent (0.25%) | 275.4 | 0.464 | 285.0 | 0.811 | 0.347 |
| 11-1 | Viscosity | 275.8 | 0.452 | 284.8 | 0.724 | 0.272 |
| 11-2 | reducer (0.5%) | 276.2 | 0.456 | 284.7 | 0.763 | 0.307 |
| 11-3 |  | 275.7 | 0.455 | 284.3 | 0.806 | 0.351 |
| 12-1 | Liquid-phase | 276.0 | 0.454 | 283.5 | 0.722 | 0.268 |
| 12-2 | lubricant | 275.9 | 0.456 | 283.7 | 0.760 | 0.304 |
| 12-3 | (0.25%) | 275.4 | 0.452 | 283.8 | 0.803 | 0.351 |

The properties of the composite elastic fiber obtained by spinning the corresponding high-viscosity and low-viscosity PET melts in Examples 2-4 are shown in Table 6, where the fiber products were FDY.

smoothing agent, the viscosity reducer or the liquid-phase lubricant is introduced into the polymerization system, the viscosity drop of the high-viscosity melt during the melt transfer process will be significantly suppressed, and the

TABLE 6

Physical and chemical indicators of two-component composite elastic fibers of Examples 2-4

| No. | Additive type | Specification | Denier count/dtex | Strength/ cN/dtex | Elongation/ % | Oil content/% | Yarn evenness CV/% | Boiling water shrinkage/% | Crimp shrinkage rate/% | Interlacing point | Denier count/ dtex |
|---|---|---|---|---|---|---|---|---|---|---|---|
| 10-1 | Solid-phase | 55/36 | 55.5 | 3.04 | 26.72 | 1.65 | 1.18 | 18.66 | 35.6 | 6 | 0.267 |
| 10-2 | smoothing | 55/36 | 55.7 | 3.11 | 24.95 | 1.65 | 1.20 | 18.03 | 42.2 | 6 | 0.307 |
| 10-3 | agent (0.25%) | 55/36 | 55.8 | 3.19 | 22.38 | 1.67 | 1.24 | 17.25 | 45.6 | 5 | 0.347 |
| 11-1 | Viscosity | 55/36 | 55.9 | 2.98 | 27.08 | 1.56 | 1.22 | 18.83 | 36.2 | 6 | 0.272 |
| 11-2 | reducer | 55/36 | 56.3 | 3.08 | 25.32 | 1.58 | 1.26 | 18.10 | 41.7 | 6 | 0.307 |
| 11-3 | (0.5%) | 55/36 | 55.8 | 3.15 | 23.00 | 1.59 | 1.19 | 17.31 | 45.2 | 6 | 0.351 |
| 12-1 | Liquid-phase | 55/36 | 55.9 | 3.00 | 26.80 | 1.51 | 1.18 | 18.77 | 35.5 | 6 | 0.268 |
| 12-2 | lubricant | 55/36 | 56.7 | 3.09 | 24.76 | 1.60 | 1.21 | 17.98 | 41.3 | 6 | 0.304 |
| 12-3 | (0.25%) | 55/36 | 55.2 | 3.17 | 22.64 | 1.59 | 1.19 | 17.04 | 45.8 | 5 | 0.351 | pipeline transfer temperature is significantly reduced, thereby improving the spinning conditions and increasing the full roll rate of fiber products.

The above embodiments are only for illustrating the technical concept and features of the present disclosure, and their purpose is to enable a person familiar with this technology to understand the content of the present disclosure and implement it accordingly, but not to limit the scope of the present disclosure. Any equivalent changes or modifications made according to the spirit of the present disclosure should fall within the scope of the present disclosure.

What is claimed is:

1. A preparation method for a PET two-component elastic fiber, the preparation method comprising steps of sequentially passing terephthalic acid, ethylene glycol and a catalyst through a first esterification reactor and a second esterification reactor for esterification reaction, and a first prepolymerization reactor and a second prepolymerization reactor for prepolymerization reaction to obtain an ethylene terephthalate prepolymer, wherein: the preparation method further comprises a step of transferring the ethylene terephthalate prepolymer, via separate melt pumps, to a high-viscosity final polymerization reactor and a low-viscosity final polymerization reactor respectively for polymerization to obtain a high-viscosity PET melt and a low-viscosity PET melt respectively, wherein the viscosity of the high-viscosity PET melt is greater than the viscosity of the low-viscosity PET melt; and a step of spinning the high-viscosity PET melt and the low-viscosity PET melt through a same parallel composite spinning assembly to obtain the PET two-component elastic fiber, wherein a difference between the intrinsic viscosity of the high-viscosity PET melt and the intrinsic viscosity of the low-viscosity PET melt is 0.100-0.550 dL/g; the high-viscosity final polymerization reactor is a horizontal polymerization reactor and comprises a main body containing a chamber internally, the main body comprises a low-viscosity zone, a medium-high-viscosity zone, and a high-viscosity zone which are arranged in sequence along an axial direction of the high-viscosity final polymerization reactor, and the viscosity of the polyethylene terephthalate melt in the low-viscosity zone, the medium-high-viscosity zone, and the high-viscosity zone increases in sequence; the length of the low-viscosity zone is three-fifths of the length of the high-viscosity final polymerization reactor, and the length of the medium-high-viscosity zone and the high-viscosity zone is two-fifths of the length of the high-viscosity final polymerization reactor; the high-viscosity final polymerization reactor further comprises two agitating shafts, one of which is arranged in the low-viscosity zone and the other is arranged in the medium-high-viscosity zone and the high-viscosity zone, and the central axes of the two agitating shafts are located on a same straight line; the length of the agitating shaft arranged in the low-viscosity zone is three-fifths of the length of the high-viscosity final polymerization reactor, and the length of the agitating shaft arranged in the medium-high-viscosity zone and the high-viscosity zone is two-fifths of the length of the high-viscosity final polymerization reactor; the high-viscosity final polymerization reactor further comprises a trumpet-shaped high-viscosity melt outlet arranged at a rear end of the high-viscosity zone.

2. The preparation method according to claim 1, wherein: each of the two agitating shafts is provided with a plurality of disc reactors; the disc reactors in the low-viscosity zone are in a three-to ten-disc combination design, the front end of the low-viscosity zone is in a ten-to six-disc combination design, the rear end of the low-viscosity zone is in a five-to three-disc combination design, and the number of disc reactors in the low-viscosity zone is 35 to 55; the high-viscosity final polymerization reactor further comprises two round distribution plates arranged at the most front end of the low-viscosity zone, and each distribution plate has six spokes by which the distribution plate is divided into six equal parts, wherein sieve plates are arranged in three equally divided fan-shaped areas which are distributed at intervals, and a large number of round holes with a diameter of 1-5 cm are distributed in each sieve plate.

3. The preparation method according to claim 2, wherein: the disc reactors in the medium-high-viscosity zone are in a four-disc combination design, a three-disc combination design and a two-disc combination design in sequence from front to rear; the medium-high-viscosity zone is also provided with a wall scraper for removing the melt from an inner wall of the high-viscosity final polymerization reactor; the number of disc reactors in the medium-high-viscosity zone is 15 to 25; the disc reactors in the high-viscosity zone are in a two-disc combination design, and 5 to 8 two-disc combinations are arranged in the high-viscosity zone; the total number of disc reactors in the medium-high-viscosity zone and the high-viscosity zone is 25 to 35; a combined scraper is also arranged in the high-viscosity zone, and the combined scraper comprises an axial scraper for removing the melt from the agitating shaft, a wall scraper for removing the melt from the inner wall of the high-viscosity final polymerization reactor and a disc scraper for removing the melt from an agitator; in the two-disc combination design in the high-viscosity zone, the spacing between the two-disc combinations and the spacing between the two discs in each combination gradually increase from front to rear.

4. The preparation method according to claim 2, wherein: the PET melt in the low-viscosity zone has an intrinsic viscosity of 0.45-0.60 dL/g and a dynamic viscosity of 90-240 Pa·s; the PET melt in the high-viscosity zone has an intrinsic viscosity of 0.68-0.90 dL/g and a dynamic viscosity of 500-1000 Pa·s.

5. The preparation method according to claim 1, wherein: the high-viscosity final polymerization reactor further comprises steam feed ports for introducing superheated ethylene glycol steam arranged at the top of the main body corresponding to the rear end of the low-viscosity zone, the rear end of the medium-high-viscosity zone, and the rear end of the high-viscosity zone; the preparation method further comprises steps of metering the superheated ethylene glycol steam with a metering system and introducing the steam into the high-viscosity final polymerization reactor.

6. The preparation method according to claim 1, wherein: the catalyst is a supported catalyst and comprises a carrier and an active component; the carrier is nano barium sulfate with a particle size of 20-50 nm and a specific surface area of 270-350 m²/g; the nano barium sulfate is prepared by reaction in anhydrous ethylene glycol; the active component comprises a main active component and a secondary active component, the main active component is titanium oxide, and the secondary active component is a mixture of scandium oxide, magnesium oxide, cobalt oxide and zinc oxide.

7. The preparation method according to claim 6, wherein: the catalyst comprises, in percent by weight, 3.3% to 10.0% of titanium oxide, 8% to 15% of the secondary active component, and 75.0% to 88.7% of nano barium sulfate; and/or, the catalyst has a particle size of 80-160 nm; and/or, the catalyst is prepared by precipitating a suspension of the carrier in ethylene glycol, scandium sulfate, magnesium sulfate, cobalt sulfate, zinc sulfate, a compound of titanium, and a precipitant, surface treating with a silane coupling agent, and calcining.

8. The preparation method according to claim 1, wherein: the PET two-component elastic fiber comprises, in percent by mass, 30%-70% of a first PET component and 70%-30% of a second PET component, and the viscosity of the first PET component is different from the viscosity of the second PET component.

9. The preparation method according to claim 1, wherein: a difference between the dynamic viscosity of the high-viscosity PET melt and the dynamic viscosity of the low-viscosity PET melt is 250-700 Pa·s.

10. A preparation method for a PET two-component elastic fiber, the preparation method comprising steps of sequentially passing terephthalic acid, ethylene glycol and a catalyst through a first esterification reactor and a second esterification reactor for esterification reaction, and a first prepolymerization reactor and a second prepolymerization reactor for prepolymerization reaction to obtain an ethylene terephthalate prepolymer, wherein: the preparation method further comprises a step of transferring the ethylene terephthalate prepolymer, via separate melt pumps, to a high-viscosity final polymerization reactor and a low-viscosity final polymerization reactor respectively for polymerization to obtain a high-viscosity PET melt and a low-viscosity PET melt respectively, wherein the viscosity of the high-viscosity PET melt is greater than the viscosity of the low-viscosity PET melt; and a step of spinning the high-viscosity PET melt and the low-viscosity PET melt through a same parallel composite spinning assembly to obtain the PET two-component elastic fiber, wherein a difference between the intrinsic viscosity of the high-viscosity PET melt and the intrinsic viscosity of the low-viscosity PET melt is 0.100-0.550 dL/g; wherein: the high-viscosity final polymerization reactor is a horizontal polymerization reactor and comprises a main body containing a chamber internally, the main body comprises a low-viscosity zone, a medium-high-viscosity zone, and a high-viscosity zone which are arranged in sequence along an axial direction of the high-viscosity final polymerization reactor, and the viscosity of the PET melt in the low-viscosity zone, the medium-high-viscosity zone, and the high-viscosity zone increases in sequence; the length of the low-viscosity zone is half of the length of the high-viscosity final polymerization reactor, and the length of the medium-high-viscosity zone and the high-viscosity zone is half of the length of the high-viscosity final polymerization reactor; the high-viscosity final polymerization reactor further comprises two agitating shafts, one of which is arranged in the low-viscosity zone and the other is arranged in the medium-high-viscosity zone and the high-viscosity zone, and the central axes of the two agitating shafts are located on a same straight line; the length of the agitating shaft arranged in the low-viscosity zone is half of the length of the high-viscosity final polymerization reactor, and the length of the agitating shaft arranged in the medium-high-viscosity zone and the high-viscosity zone is half of the length of the high-viscosity final polymerization reactor; the high-viscosity final polymerization reactor further comprises a trumpet-shaped high-viscosity melt outlet arranged at a rear end of the high-viscosity zone.

11. The preparation method according to claim 10, wherein: each of the two agitating shafts is provided with a plurality of disc reactors; the disc reactors in the low-viscosity zone are in a design of multiple multi-disc combinations; the high-viscosity final polymerization reactor further comprises two round distribution plates arranged at the most front end of the low-viscosity zone, and each distribution plate has six spokes by which the distribution plate is divided into six equal parts, wherein sieve plates are arranged in three equally divided fan-shaped areas which are distributed at intervals, and a large number of round holes with a diameter of 1-5 cm are distributed in each sieve plate.

12. The preparation method according to claim 10, wherein: the disc reactors in the medium-high-viscosity zone are in a design of 8 to 10 double-disc combinations; the disc reactors in the high-viscosity zone are in a single-disc design and the number of disc reactors in the high-viscosity zone is 6 to 15; the disc reactors in the high-viscosity zone adopt a reinforced design; a combined scraper is also arranged in the high-viscosity zone, and the combined scraper comprises an axial scraper for removing the melt from the agitating shaft, a wall scraper for removing the melt from an inner wall of the high-viscosity final polymerization reactor, and a disc scraper for removing the melt from an agitator; the wall scraper is in a spiral shape that rotates along the axial direction; the axial scraper and the disc scraper are arranged between the disc reactors; the wall scraper is arranged at an outer edge of the disc reactor; from front to rear, the spacing between the disc scraper and the adjacent disc reactor and the spacing between the wall scraper and the inner wall of the high-viscosity final polymerization reactor gradually decrease; diameters of the disc reactors in the high-viscosity zone decrease from front to rear, and the diameter of the last disc reactor in the high-viscosity zone is 85% of the diameter of the first disc reactor in the high-viscosity zone.

13. The preparation method according to claim 10, wherein: the PET melt in the low-viscosity zone has an intrinsic viscosity of 0.45-0.60 dL/g and a dynamic viscosity of 90-240 Pa·s; the PET melt in the high-viscosity zone has an intrinsic viscosity of 0.68-0.90 dL/g and a dynamic viscosity of 450-1000 Pa·s.

14. The preparation method according to claim 10, wherein: the high-viscosity final polymerization reactor further comprises steam feed ports for introducing superheated ethylene glycol steam arranged at the top of the main body corresponding to the rear end of the low-viscosity zone, the rear end of the medium-high-viscosity zone, and the rear end of the high-viscosity zone; the preparation method further comprises steps of metering the superheated ethylene glycol steam with a metering system and introducing the steam into the high-viscosity final polymerization reactor.

15. The preparation method according to claim 10, wherein: the catalyst is a supported catalyst and comprises a carrier and an active component; the carrier is nano barium sulfate with a particle size of 20-50 nm and a specific surface area of 270-350 m$^2$/g; the nano barium sulfate is prepared by reaction in anhydrous ethylene glycol; the active component comprises a main active component and a secondary active component, the main active component is titanium oxide, and the secondary active component is a mixture of scandium oxide, magnesium oxide, cobalt oxide and zinc oxide.

16. The preparation method according to claim 15, wherein: the catalyst comprises, in percent by weight, 3.3% to 10.0% of titanium oxide, 8% to 15% of the secondary active component, and 75.0% to 88.7% of nano barium sulfate; and/or, the catalyst has a particle size of 80-160 nm; and/or, the catalyst is prepared by precipitating a suspension of the carrier in ethylene glycol, scandium sulfate, magnesium sulfate, cobalt sulfate, zinc sulfate, a compound of titanium, and a precipitant, surface treating with a silane coupling agent, and calcining.

17. The preparation method according to claim 10, wherein: the PET two-component elastic fiber comprises, in percent by mass, 30%-70% of a first PET component and 70%-30% of a second PET component, and the viscosity of the first PET component is different from the viscosity of the second PET component.

18. The preparation method according to claim 10, wherein: a difference between the dynamic viscosity of the high-viscosity PET melt and the dynamic viscosity of the low-viscosity PET melt is 250-700 Pa·s.

* * * * *